July 23, 1940.                    C. R. CHANG                    2,209,112
CUTTER
Filed May 8, 1939
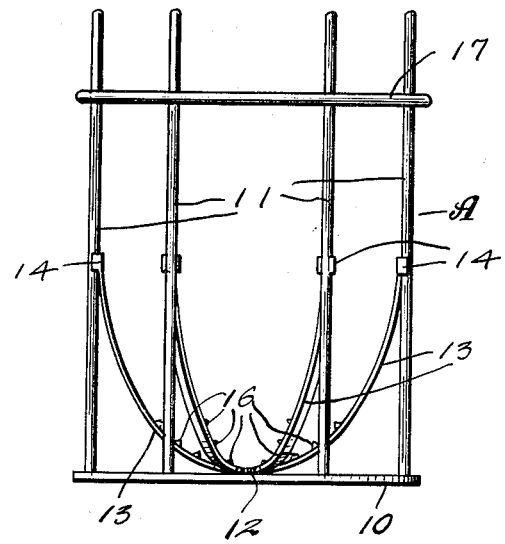
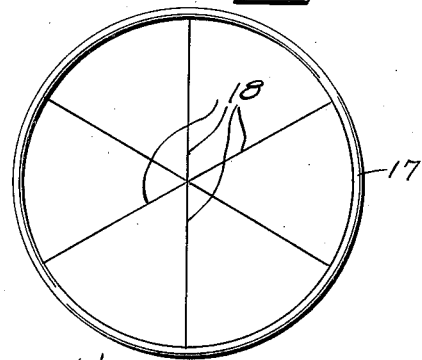
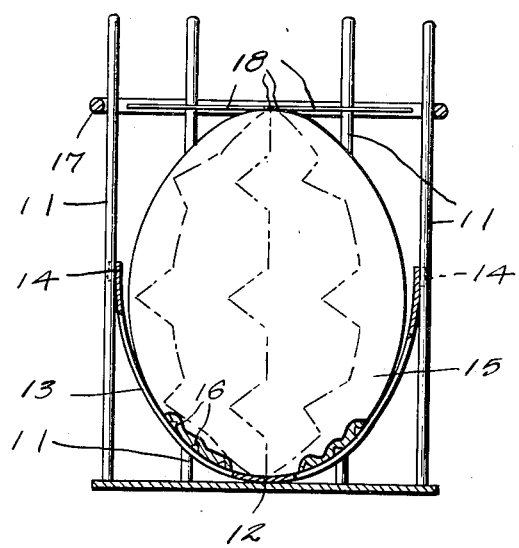
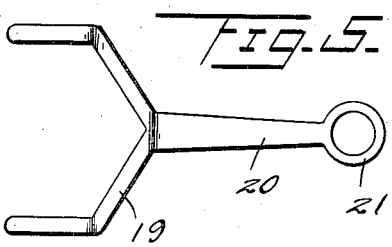
C.R. Chang
INVENTOR
BY Victor J. Evans & Co.
ATTORNEYS Patented July 23, 1940

2,209,112

UNITED STATES PATENT OFFICE 2,209,112

CUTTER

Carlos Rene Chang, Guatemala City, Guatemala

Application May 8, 1939, Serial No. 272,504

1 Claim. (Cl. 146—160)

The invention relates to a cutter and more especially to an egg cutter.

The primary object of the invention is the provision of a device of this character wherein a hard boiled egg can be conveniently held so that it may be sliced or cut into a plurality of fragments and these having ornamental shape following symmetrical lines so that the cut particles can be dressed on a salad or other food product for ornamentation thereto.

Another object of the invention is the provision of a device of this character wherein the egg is supported in a novel manner so that it can be cut into a number of parts and these having a variety of shapes whereby the parts when used upon edibles will be decorative thereto on the serving of the same, the device being of novel construction and is manually operated.

A further object of the invention is the provision of a device of this character which is extremely simple in its construction, thoroughly reliable and efficient in operation, possessed of few parts, these being assembled with each other for the quick and fanciful cutting of hard boiled eggs or the like, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention and pointed out in the claim hereunto appended.

In the accompanying drawing:

Figure 1 is an elevation of the device constructed in accordance with the invention.

Figure 2 is a top plan view of the cutting unit of the device.

Figure 3 is a plan view of the saddling part of the holder for the egg.

Figure 4 is a vertical longitudinal sectional view through the device showing an egg placed therein and dotted lines in contradistinction to the full lines being indicative of the line of cut of the egg.

Figure 5 is a tool or implement employed for the removal of the cut parts of the egg.

Figure 6 is an edge elevation of this tool.

Similar reference characters indicate corresponding parts throughout the several views in the drawing.

Referring to the drawing in detail, A designates generally the device constituting the present invention and comprises a holder involving a flat disc-like base 10 from which rises from the uppermost space thereof close to the outer periphery upstanding or vertical posts 11 which are uniformly spaced from each other and are of corresponding length one to the other, being rigidly joined with the base.

Arranged within the holder is a saddling unit in the form of a dished triple arm spider 12 its arms 13 being curved laterally and upwardly and are formed with terminal clips 14 which partially embrace the posts 11 as is clearly shown in Figures 1, 3 and 4 of the drawing. Within this saddling unit is placed the hard boiled egg 15 to be cut or sliced. The arms 13 of the spider 12 carry spurs 16 to bight into the egg 15 when within the saddling unit to hold it fixed during the cutting operation.

Encircling the posts 11 is a cutting unit involving a ring 17 carrying crossed taut cutting wires 18, these being united to the ring in any suitable manner for the holding of the same in a taut condition, the crossing point of the wires 18 being at the center of the ring and such wires from this center extend radially outwardly therefrom. Any number of wires may be used. The ring 17 with the wires 18 carried thereby is turned concentrically about the posts and moved upwardly or downwardly away from or toward the base 10 of the holder and when moving toward the said base the egg 15 will be sliced or cut into a plurality of parts, the turning of the ring 17 being for diverging the line of cut of the wires 18 so that the slices cut will be irregularly sliced as will appear from the dotted lines in Figure 4 of the drawing. By reason of the manipulation of the ring 17 with the wires 18 a variety of fancy cut pieces can be had in the slicing or cutting of the hard boiled egg 15 when within the saddling unit and these pieces are employed for decorative purposes in the dressing of salads or other edibles.

The clips 14 of the arms 13 of the saddling unit can be slipped off of the posts 11 and in this manner the cleaning or washing of the device is facilitated and also assures a sanitary condition thereto.

In Figures 5 and 6 of the drawing there is shown a tool for use with the device and includes a forked head 19 extending from a shank 20 having an eye terminal 21 by which the tool can be hung up when not in use. The forked head 19 enables in the use of the tool the removal of the cut or sliced pieces of egg 15 from the saddling unit of the device, the tool being particularly for this purpose.

What is claimed is:

A device of the character described comprising a base, vertical posts arranged spaced from each other and rising from the uppermost face of said base, a dished saddling unit arranged between the posts and having a triple-armed spider formed with terminal clips partially embracing the posts to have the spider rest upon said base, said spider being formed with spurs for holding an egg when within the saddle unit, a ring encircling said posts for rotation and sliding movement thereon, and cutting wires arranged within the ring and disposed for crossing each other at the central axis of said ring.

CARLOS R. CHANG.